United States Patent
Lee et al.

(10) Patent No.: US 10,637,056 B2
(45) Date of Patent: Apr. 28, 2020

(54) METHOD OF PREPARING POSITIVE ELECTRODE ACTIVE MATERIAL FOR SECONDARY BATTERY AND POSITIVE ELECTRODE ACTIVE MATERIAL FOR SECONDARY BATTERY PREPARED THEREBY

(71) Applicant: LG Chem, Ltd., Seoul (KR)

(72) Inventors: Hyuck Lee, Daejeon (KR); Seung Beom Cho, Daejeon (KR); San Su Son, Daejeon (KR); Jin Wook Ju, Daejeon (KR); Sang Soon Choi, Daejeon (KR); Jong Pil Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/069,710

(22) PCT Filed: Jul. 4, 2017

(86) PCT No.: PCT/KR2017/007114
§ 371 (c)(1),
(2) Date: Jul. 12, 2018

(87) PCT Pub. No.: WO2018/008952
PCT Pub. Date: Jan. 11, 2018

(65) Prior Publication Data
US 2019/0036119 A1   Jan. 31, 2019

(30) Foreign Application Priority Data
Jul. 4, 2016   (KR) .................. 10-2016-0084359
Jul. 3, 2017   (KR) .................. 10-2017-0084337

(51) Int. Cl.
*H01M 4/525*     (2010.01)
*H01M 10/0525*   (2010.01)
(Continued)

(52) U.S. Cl.
CPC ............ *H01M 4/525* (2013.01); *C01G 53/50* (2013.01); *C01G 53/70* (2013.01); *H01M 4/131* (2013.01);
(Continued)

(58) Field of Classification Search
CPC . B05D 7/00; B05D 17/00; B05C 13/02; B01J 2/16
(Continued)

(56) References Cited

U.S. PATENT DOCUMENTS

2005/0249871 A1   11/2005   Tokarski et al.
2006/0275667 A1   12/2006   Watanabe et al.
(Continued)

FOREIGN PATENT DOCUMENTS

CN      1897336 A     1/2007
CN    100527489 C     8/2009
(Continued)

OTHER PUBLICATIONS

Chinese Search report for Appl. No. 201780010065.6 dated Sep. 29, 2019.
(Continued)

*Primary Examiner* — Khanh T Nguyen
(74) *Attorney, Agent, or Firm* — Lerner, David, Littenberg, Krumholz & Mentlik, LLP

(57) ABSTRACT

Provided are a method of preparing a positive electrode active material for a secondary battery, in which the positive electrode active material is uniformly doped with various doping elements without worrying about surface damage of the active material and characteristics degradation by including mixing a metal precursor for a positive electrode active material and a raw material including a doping element, in which an average particle diameter ratio is in a range of 5:1 to 2,000:1, using acoustic resonance to prepare a precursor (Continued)

doped with the doping element, and mixing the doped precursor with a lithium raw material and performing a heat treatment, and a positive electrode active material which has improved structure stability by being prepared by the above method and may improve battery characteristics, for example, capacity reduction may be minimized and cycle characteristics may be improved when used in the battery.

16 Claims, 13 Drawing Sheets

(51) Int. Cl.
    *C01G 53/00*     (2006.01)
    *H01M 4/131*     (2010.01)
    *H01M 4/505*     (2010.01)
    *H01M 4/02*     (2006.01)

(52) U.S. Cl.
    CPC ....... *H01M 4/505* (2013.01); *H01M 10/0525* (2013.01); *C01P 2002/52* (2013.01); *C01P 2004/03* (2013.01); *C01P 2004/20* (2013.01); *C01P 2004/45* (2013.01); *C01P 2004/51* (2013.01); *C01P 2004/61* (2013.01); *C01P 2004/62* (2013.01); *C01P 2004/64* (2013.01); *C01P 2006/40* (2013.01); *H01M 2004/028* (2013.01)

(58) Field of Classification Search
    USPC ........................................................ 427/213
    See application file for complete search history.

(56) References Cited

U.S. PATENT DOCUMENTS

| | | |
|---|---|---|
| 2007/0134554 A1 | 6/2007 | Armand et al. |
| 2012/0156566 A1 | 6/2012 | Akalay et al. |
| 2012/0270107 A1 | 10/2012 | Toya et al. |
| 2012/0276446 A1 | 11/2012 | Kawai |
| 2013/0164664 A1 | 6/2013 | Kamel et al. |
| 2013/0202790 A1* | 8/2013 | Li ........................ B01J 2/16 427/213 |
| 2014/0271321 A1 | 9/2014 | Maderud et al. |
| 2014/0356717 A1 | 12/2014 | Gunji et al. |
| 2016/0028077 A1 | 1/2016 | Kwak et al. |
| 2016/0293951 A1 | 10/2016 | Lim et al. |
| 2017/0271656 A1 | 9/2017 | Lee et al. |
| 2017/0324084 A1 | 11/2017 | Lee et al. |

FOREIGN PATENT DOCUMENTS

| | | |
|---|---|---|
| CN | 104995769 A | 10/2015 |
| EP | 2571084 A2 | 3/2013 |
| JP | 2000327339 A | 11/2000 |
| JP | 2008013405 A | 1/2008 |
| JP | 2009173538 A | 8/2009 |
| JP | 2011116580 A | 6/2011 |
| JP | 2012238581 A | 12/2012 |
| JP | 2013089321 A | 5/2013 |
| JP | 2013130869 A | 7/2013 |
| JP | 2013131415 A | 7/2013 |
| JP | 2015501377 A | 1/2015 |
| KR | 100694052 B1 | 3/2007 |
| KR | 20140091557 A | 7/2014 |
| KR | 101596005 B1 | 2/2016 |
| KR | 20160068687 A | 6/2016 |
| KR | 20160068688 A | 6/2016 |
| WO | 2015130106 A1 | 9/2015 |
| WO | 2016089176 A1 | 6/2016 |

OTHER PUBLICATIONS

International Search Report for PCT/KR2017/007114 dated Oct. 31, 2017.
Extended European Search Report including Written Opinion for Application No. EP17824508.0 dated Mar. 11, 2019.

* cited by examiner

METHOD OF PREPARING POSITIVE ELECTRODE ACTIVE MATERIAL FOR SECONDARY BATTERY AND POSITIVE ELECTRODE ACTIVE MATERIAL FOR SECONDARY BATTERY PREPARED THEREBY

CROSS-REFERENCE TO RELATED APPLICATIONS

This application is a national phase entry under 35 U.S.C. § 371 of International Application No. PCT/KR2017/007114, filed Jul. 4, 2017, which claims priority to Korean Patent Application No. 10-2016-0084359, filed Jul. 4, 2016, and Korean Patent Application No. 10-2017-0084337, filed Jul. 3, 2017, the disclosures of which are incorporated herein by reference.

Technical Field

The present invention relates to a method of preparing a positive electrode active material, which may exhibit excellent structural stability by being uniformly doped with a doping element without worrying about surface damage of the active material and property degradation, and a positive electrode active material prepared thereby.

Background Art

Lithium secondary batteries have been widely used as power sources of portable devices after they have emerged as small, lightweight, and high-capacity batteries since 1991. Recently, in line with the rapid development of electronics, communications, and computer industries, camcorders, mobile phones, and notebook PCs have appeared and undergone continuous and remarkable development. Accordingly, the demand for lithium secondary batteries as a power source for driving these portable electronic information and communication devices has increased day by day.

Lithium secondary batteries have limitations in that their lifetime rapidly decreases as charge and discharge are repeated. In particular, these limitations are more serious at high temperature or a high voltage. The reason for this is due to a phenomenon that occurs when an electrolyte is decomposed or an active material is degraded due to moisture in the battery or other effects, and internal resistance of the battery increases.

Accordingly, a positive electrode active material for a lithium secondary battery, which has been actively researched and developed and is currently being used, is layer-structured $LiCoO_2$. Since $LiCoO_2$ has excellent life characteristics and charge and discharge efficiency, the $LiCoO_2$ is the most widely used, but there is a limitation in using the $LiCoO_2$ in high-capacity battery technology due to low structural stability.

As a positive electrode active material alternative to $LiCoO_2$, various lithium transition metal oxides, such as $LiNiO_2$, $LiMnO_2$, $LiMn_2O_4$, $LiFePO_4$, and $Li(Ni_xCo_yMn_z)O_2$, have been developed. Among these oxides, $LiNiO_2$ is advantageous in that it exhibits battery characteristics of high discharge capacity, but the synthesis thereof may be difficult by a simple solid phase reaction, and thermal stability and cycle characteristics may be low. Also, a lithium manganese-based oxide, such as $LiMnO_2$ or $LiMn_2O_4$, is advantageous in that its thermal stability is excellent and the price is low, but capacity may be low and high-temperature characteristics may be poor. Particularly, with respect to $LiMn_2O_4$, some have been commercialized as low-cost products, but life characteristics were poor due to structural distortion (Jahn-Teller distortion) caused by $Mn^{+3}$. Furthermore, since $LiFePO_4$ is inexpensive and has excellent stability, a significant amount of research has currently been conducted for the application of $LiFePO_4$ for a hybrid electric vehicle (HEV). However, the application to other areas may be difficult due to low conductivity.

Thus, $Li(Ni_xCo_yMn_z)O_2$ (where, x, y, and z are each independently an atomic fraction of oxide composition elements, wherein $0<x\leq1$, $0<y\leq1$, $0<z\leq1$, and $0<x+y+z\leq1$) is a material which is currently very much in the spotlight as a positive electrode active material alternative to $LiCoO_2$. This material is less expensive than $LiCoO_2$ and may be used in high voltage and high capacity applications, but the $Li(Ni_xCo_yMn_z)O_2$ has limitations in that rate capability and life characteristics at high temperature may be poor.

Accordingly, many attempts have been made to improve thermal stability, capacity characteristics, or cycle characteristics of the positive electrode active material through a method of doping a material, such as aluminum (Al), titanium (Ti), tin (Sn), silver (Ag), or zinc (Zn), into the positive electrode active material or dry or wet coating a surface of the positive electrode active material with a highly conductive metal, but the degree of improvement is still insufficient.

Particularly, in a case in which the positive electrode active material is doped, structural stability of the positive electrode active material is improved, but capacity may be reduced. Also, a uniform distribution of the doping material in the positive electrode active material is difficult, and active material characteristics may be degraded due to a non-uniform distribution of the doping material.

DISCLOSURE OF THE INVENTION

Technical Problem

An aspect of the present invention provides a method of preparing a positive electrode active material in which, since the positive electrode active material is uniformly doped with a doping element using acoustic resonance without worrying about surface damage of the active material and characteristics degradation, improved structural stability may be obtained and battery characteristics may be improved, for example, capacity reduction may be minimized and cycle characteristics may be improved when used in a battery.

Another aspect of the present invention provides a positive electrode active material which has the improved structure stability by being prepared by the above preparation method and, accordingly, may improve capacity, rate capability, and cycle characteristics of the battery.

Another aspect of the present invention provides a positive electrode and a lithium secondary battery which include the positive electrode active material.

Technical Solution

According to an aspect of the present invention, there is provided a method of preparing a positive electrode active material for a secondary battery including: mixing a metal precursor for a positive electrode active material and a raw material including a doping element using acoustic resonance to prepare a precursor doped with the doping element; and mixing the doped precursor with a lithium raw material and performing a heat treatment, wherein an average particle diameter ratio of the metal precursor for a positive electrode active material to the raw material including a doping element is in a range of 5:1 to 2,000:1.

According to another aspect of the present invention, there is provided a positive electrode active material for a secondary battery prepared by the above method and including a lithium composite metal oxide of Formula 2 which is doped with a metallic element:

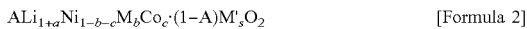
$$ALi_{1+a}Ni_{1-b-c}M_bCo_{c'}(1-A)M'_sO_2 \qquad \text{[Formula 2]}$$

wherein, in Formula 2,

M includes at least one element selected from the group consisting of manganese (Mn) and aluminum (Al), and M' includes at least one element selected from the group consisting of yttrium (Y), zirconium (Zr), lanthanum (La), strontium (Sr), gallium (Ga), magnesium (Mg), scandium (Sc), gadolinium (Gd), samarium (Sm), calcium (Ca), cerium (Ce), iron (Fe), aluminum (Al), titanium (Ti), tantalum (Ta), niobium (Nb), tungsten (W), molybdenum (Mo), and chromium (Cr), wherein $0 < A < 1$, $0 \le a \le 0.33$, $0 \le b \le 0.5$, $0 \le c \le 0.5$, and $0 < s \le 0.2$, but b and c are not 0.5 at the same time.

According to another aspect of the present invention, there is provided a positive electrode and a lithium secondary battery which include the above positive electrode active material.

Advantageous Effects

Since a method of preparing a positive electrode active material according to the present invention uses acoustic resonance when preparing a positive electrode active material including a doped lithium composite metal oxide, the method may uniformly dope the lithium composite metal oxide with a doping element without worrying about surface damage of the active material and characteristics degradation, and as a result, the method may further increase structural stability of the positive electrode active material in comparison to doping according to a conventional method and may further improve capacity, rate capability, and cycle characteristics of a battery. Also, according to the above method, a dead zone due to stirring deviation generated during mixing by a conventional method may be minimized, the generation of fine dust during the preparation of the active material may be suppressed, and quantitative measurement is facilitated.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
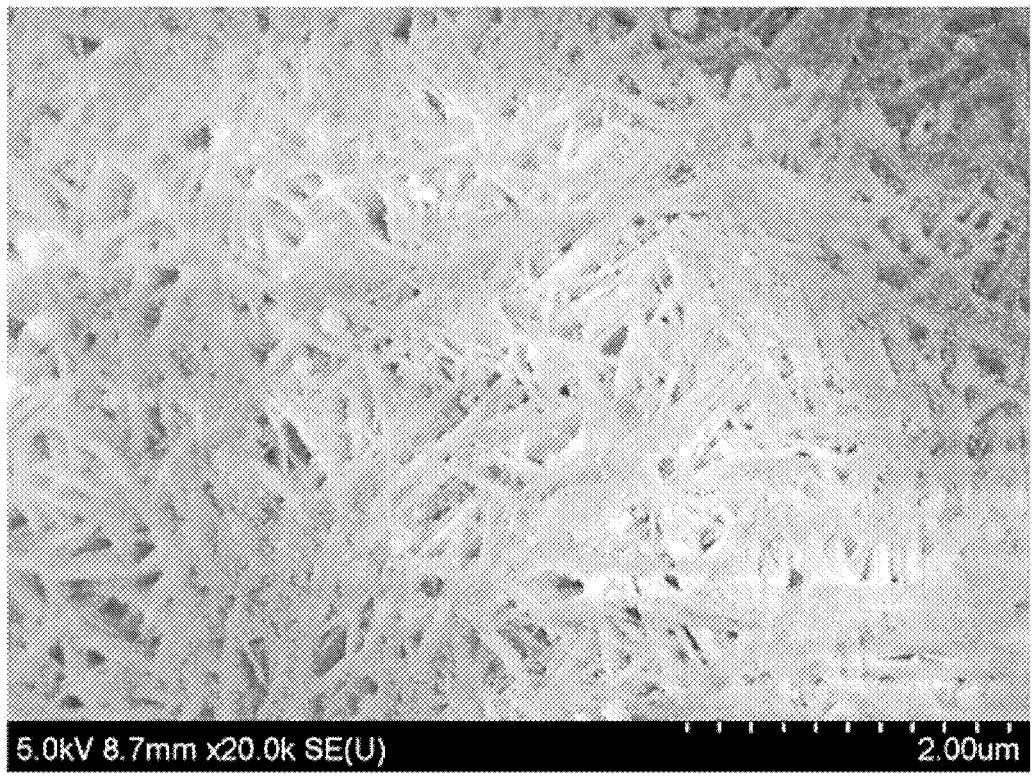
FIG. 1 is a scanning electron microscope (SEM) image of a doping precursor prepared in Example 1-1.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The conventional preparation of a doped positive electrode active material is performed by a heat treatment, after dry mixing or wet mixing of a positive electrode active material or a precursor thereof with a raw material including a doping element. With respect to the dry mixing, its process is simple, but it has a limitation in that uniform dispersion is not achieved or the doping material is easily agglomerated, and dust may be generated when using fine powder. Also, with respect to the wet mixing, uniform dispersion and doping are possible in comparison to the dry mixing, but its process may be complex. Furthermore, both of the dry mixing and wet mixing have a limitation in that a dead zone due to stirring deviation during the mixing may be generated and mixing may occur due to a continuous process.

In contrast, in the present invention, since a metal precursor for a positive electrode active material and a raw material including a doping element are mixed using acoustic resonance during the preparation of a doped positive electrode active material and particle sizes of the metal precursor and the raw material including a doping element are controlled together according to acoustic resonance conditions, the metal precursor may be uniformly doped with the doping element without worrying about surface damage of the active material and characteristics degradation and the dead zone due to the stirring deviation may be minimized. As a result, structural stability of the positive electrode active material may be more significantly increased in comparison to the doping according to the conventional method, and thus, capacity, rate capability, and cycle characteristics of a battery may be further improved.

That is, a method of preparing a positive electrode active material for a secondary battery according to an embodiment of the present invention includes the steps of:

mixing a metal precursor for a positive electrode active material and a raw material including a doping element using acoustic resonance to prepare a precursor doped with the doping element (step 1); and mixing the doped precursor with a lithium raw material and performing a heat treatment (step 2). In this case, an average particle diameter ratio of the metal precursor for a positive electrode active material to the raw material including a doping element is in a range of 5:1 to 2,000:1.

Hereinafter, each step will be described in detail. In the method of preparing a positive electrode active material according to the embodiment of the present invention, step 1 is a step of preparing a doped precursor.

Specifically, step 1 may be performed by mixing a metal precursor for a positive electrode active material and a raw material including a doping element using acoustic resonance.

During the mixing by acoustic resonance, if acoustic vibration is applied to a material to be mixed, acoustic energy directly vibrates the material to be mixed, and, in this case, resonance occurs by a particular frequency of acoustic vibration and mixing occurs by the resonance. The mixing by acoustic resonance is different from ultrasonic mixing or mixing by stirring with an impeller installed in a typical planetary mixer or speed mixer. Since low frequency and high intensity acoustic energy forms a shear field while exerting a uniform shear force over an entire mixing system with fast g-forces, the mixing by acoustic resonance enables rapid fluidization and dispersion. Also, with respect to the mixing by acoustic resonance, since the frequency of the acoustic energy is several hundred times lower than that of the ultrasonic mixing, mixing scale may be larger. In addition, different from the impeller stirring in which mixing occurs by bulk flow, since small-scale mixing occurs multiple times over the entire mixing system, uniform dispersion is possible.

Furthermore, since the raw material including a doping element, such as yttria-stabilized zirconia, used for doping the metal precursor for a positive electrode active material in the present invention has very low miscibility and reactivity with the precursor, uniform doping is difficult. However, in the present invention, since the mixing by acoustic resonance is performed, dispersibility of the raw material including a doping element as well as the reactivity with the precursor is increased, and thus, uniform doping on the surface of the precursor is possible.

The mixing by acoustic resonance may be performed by using a conventional acoustic resonance device, and, specifically, may be performed by using an acoustic mixer.

In a mixing process by acoustic resonance, mixing conditions may vary depending on a particle size ratio of the metal precursor for a positive electrode active material and the raw material including a doping element used, furthermore, each type thereof, and, in order to obtain uniform and excellent doping efficiency while minimizing surface damage and loss of the metal precursor and active material, it is desirable to optimize the particle sizes of the metal precursor and the raw material including a doping element. Furthermore, it is more desirable to optimize each type thereof as well as the particle sizes.

Specifically, an average particle diameter ratio of the metal precursor for a positive electrode active material to the raw material including a doping element may be in a range of 5:1 to 2,000:1, particularly 5:1 to 1,000:1 or 5:1 to 300:1, and more particularly 5:1 to 7.5:1. When the above-described average particle diameter ratio condition is satisfied, the raw material including a doping element may be uniformly dispersed with better efficiency without damage and loss of precursor particles.

Specifically, under conditions in which an average particle diameter ($D_{50}$) of the raw material including a doping element is in a range of 4 nm to 5 μm, or 10 nm to 5 μm, for example, 50 nm to 3 μm, and an average particle diameter ($D_{50}$) of the metal precursor for a positive electrode active material is in a range of 10 μm to 20 μm, the average particle diameter ratio of the metal precursor for a positive electrode active material to the raw material including a doping element may be in a range of 5:1 to 2,000:1, particularly 5:1 to 1,000:1 or 5:1 to 300:1, and more particularly 5:1 to 7.5:1.

Also, the mixing by acoustic resonance of the metal precursor for a positive electrode active material and the raw material including a doping element, which satisfy the above-described particle diameter conditions, may be performed by applying an acoustic energy of 50 g to 90 g, and specifically, may be performed by applying an acoustic energy of 50 g to 90 g for 1 minute to 5 minutes. In this case, the unit "g" denotes a gravitational acceleration (100 g=980 m/s$^2$).

Furthermore, a mixing pattern of the doping material and the metal precursor may vary depending on a structure of the metal precursor for a positive electrode active material.

Specifically, in the present invention, the metal precursor for a positive electrode active material may be a secondary particle in which a plurality of primary particles are agglomerated, and, in this case, the primary particle may have a plate shape. In this case, density of the secondary particulate metal precursor may vary depending on a plate thickness of the primary particle, and, as a result, a doping pattern of the doping element with respect to the metal precursor may change. Thus, more uniform and efficient doping is possible by optimizing conditions during the acoustic resonance according to the plate thickness of the primary particle.

Specifically, under the conditions in which the metal precursor for a positive electrode active material and the raw material including a doping element satisfy the above-described average particle diameter ratio, the primary particles constituting the metal precursor for a positive electrode active material may have a plate shape, and the plate may have an average thickness of 150 nm or less, for example, 80 nm to 130 nm. Typically, with respect to a metal precursor formed by agglomeration of primary particles having a plate shape, since pores may be formed between the plate-shaped primary particles, the secondary particulate metal precursor may have a large specific surface area. However, in this case, since the introduction of a doping element into the pores between the primary particles is not easy, an amount of the doping element introduced may be small or the pores remain empty and doping with the doping element may mainly occur on the surface of the secondary particulate metal precursor. In contrast, in a case in which the mixing by acoustic resonance is performed by applying a force of 50 g to 90 g for 1 minute to 4 minutes, excellent doping efficiency may be achieved by uniformly introducing the doping element into the pores between the plate-shaped primary particles, and, as a result, the structural stability of the active material may be improved.

In the present invention, the expression "plate shape" or "plate form" denotes an aggregate structure in which two sides corresponding or opposite to each other are flat and a size in a horizontal direction is larger than a size in a vertical direction, and may include a shape similar to a plate shape, such as a flake shape and a scaly shape, as well as a complete plate shape. Also, an average plate thickness of the plate-shaped primary particles is an average value of plate thicknesses of the primary particles observed with a scanning electron microscope (SEM).

Furthermore, under the conditions in which the metal precursor for a positive electrode active material and the raw material including a doping element satisfy the above-described average particle diameter ratio, in a case in which the primary particles constituting the metal precursor for a positive electrode active material have a plate shape and the plate has an average thickness of greater than 150 nm, for example, 200 nm to 250 nm, the metal precursor may be a secondary particulate having a dense structure in which the pores between the plate-shaped primary particles are small. Typically, with respect to a precursor composed of primary particles having the above-described thickness, since the introduction of a doping element into pores between the primary particles is more difficult than a metal precursor including primary particles in the form of a thin plate, the doping element is mainly disposed on the surface of the precursor, wherein, in this case, agglomeration of the doping element may occur locally on the surface of the secondary particulate. In contrast, in a case in which the mixing by acoustic resonance is performed by applying a force of 60 g to 90 g for 2 minutes to 5 minutes, a layer of the doping element is formed in which the surface of the secondary particulate precursor is uniformly coated with the doping element. In this case, an amount of lithium composite metal oxide doped on a surface side of the active material is increased, and, as a result, stability of the active material surface may be increased.

In the method of preparing a positive electrode active material according to the embodiment of the present invention, the doping element may specifically be yttrium (Y), zirconium (Zr), lanthanum (La), strontium (Sr), gallium (Ga), magnesium (Mg), scandium (Sc), gadolinium (Gd), samarium (Sm), calcium (Ca), cerium (Ce), iron (Fe), aluminum (Al), titanium (Ti), tantalum (Ta), niobium (Nb), tungsten (W), molybdenum (Mo), or chromium (Cr), and may include at least one element thereof.

Specifically, the doping element may be an element corresponding to Group 6 (VIB) of the Periodic Table which may improve the structural stability of the active material by suppressing particle growth in a sintering process during the preparation of the active material particles. For example, the doping element may be at least one element selected from the group consisting of W, Mo, and Cr, and particularly, may be at least one element selected from the group consisting of W and Cr.

Also, the doping element, particularly, may be an element corresponding to Group 13 (IIIA) of the Periodic Table, and more particularly, may be at least one element selected from the group consisting of boron (B), Al, Ga, and indium (In).

Furthermore, the doping element, particularly, may be at least one element selected from the group consisting of Group 3 (IIIB) and 4 (IV) elements, and more particularly, may be at least one element selected from the group consisting of Ti, Sc, Y, Zr, and La.

Also, the doping element, particularly, may be an element corresponding to Group 5 (V), and more particularly, may be at least one element selected from the group consisting of vanadium (V), Nb, and Ta.

Furthermore, the raw material including a doping element may be an oxide, such as $Al_2O_3$, a hydroxide, or an oxyhydroxide which includes the above-described doping element, and any one thereof or a mixture of two or more thereof may be used.

Also, the raw material including a doping element may be a ceramic-based ion conductor which not only has excellent lithium ion conductivity in itself, but may also further improve the structural stability of the active material along with a better doping effect when doping with a metallic element derived therefrom. The ceramic-based ion conductor may specifically include at least one of ion conductive ceramic and metal ceramic.

Specific examples of the ion conductive ceramic may be a Y, Ca, Ni, or Sc-doped zirconia ($ZrO_2$)-based oxide such as yttria-stabilized zirconia (YSZ), calcia-stabilized zirconia (CSZ), and scandia-stabilized zirconia (SSZ); a Gd, Y, or Sm-doped ceria ($CeO_2$)-based oxide such as gadolinia-doped ceria (GDC), samarium-doped ceria (SDC), and yttria-doped ceria (YDC); and a lanthanum-based oxide such as lanthanum strontium gallate magnesite (LSGM), lanthanum strontium manganite (LSM), or lanthanum strontium cobalt ferrite (LSCF), and one alone or a mixture of two or more thereof may be used.

Also, in the ion conductive ceramic, the YSZ is a ceramic material which is made stable even at room temperature by adding yttrium oxide (yttria) to zirconium oxide (zirconia). In the YSZ, some of $Zr^{4+}$ ions may be substituted with $Y^{3+}$ by adding the yttria to the zirconia. Accordingly, four $O^{2-}$ ions are replaced by three $O^{2-}$ ions, and, as a result, an oxygen vacancy may be generated. The YSZ has $O^{2-}$ ion conductivity due to the generated oxygen vacancies, and the conductivity increases as the temperature increases. Specifically, the YSZ is $Zr_{(1-x)}Y_xO_{2-x/2}$, wherein $0.01 \leq x \leq 0.30$, for example, $0.08 \leq x \leq 0.10$. In the present invention, the room temperature denotes a temperature range of 23±5° C. unless otherwise defined. The YSZ may be $Zr_{(1-x)}Y_xO_{2-x/2}$ (where $0.01 \leq x \leq 0.30$, for example, $0.08 \leq x \leq 0.10$).

The metal ceramic is manufactured by mixing and sintering ceramic and metal powder, wherein it has both characteristics of ceramic having high heat resistance and hardness and characteristics of metal having plastic deformation or electrical conductivity. Specifically, in the metal ceramic, the ceramic may be the above-described ion conductive ceramic, and the metal may be nickel, molybdenum, or cobalt. For example, the metal ceramic may be a cermet such as a Ni—YSZ cermet.

Also, in the method of preparing a positive electrode active material according to the embodiment of the present invention, the average particle diameter ($D_{50}$) of the raw material including a doping element may be in a range of 4 nm to 5 μm. When the average particle diameter of the raw material including a doping element is within the above range, uniform dispersion is possible during the mixing by an acoustic resonance method, and the precursor may be doped with high efficiency. Specifically, the average particle diameter ($D_{50}$) of the raw material including a doping element may be in a range of 10 nm to 5 μm, for example, 50 nm to 3 μm.

In the present invention, the average particle diameter ($D_{50}$) of the raw material including a doping element may be defined as a particle diameter at 50% in a cumulative particle diameter distribution. The average particle diameter ($D_{50}$) of the raw material including a doping element may be measured by using a laser diffraction method. Specifically, the raw material including a doping element is introduced into a laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

Furthermore, in the method of preparing a positive electrode active material according to the embodiment of the present invention, an amount of the raw material including a doping element used may be appropriately selected according to an amount of a metallic element derived from the raw material including a doping element which is doped on the lithium composite metal oxide in the finally prepared positive electrode active material. Specifically, the raw material including a doping element may be used in an amount of 500 ppm to 20,000 ppm, for example, 1,000 ppm to 8,000 ppm based on a total amount of the metal precursor for a positive electrode active material and the raw material including a doping element.

In the method of preparing a positive electrode active material according to the embodiment of the present invention, the metal precursor for a positive electrode active material, as a material which may form a lithium composite metal oxide capable of reversibly intercalating and deintercalating lithium, may specifically be an oxide, hydroxide, oxyhydroxide, or phosphate containing a metal for a positive electrode active material, and any one thereof or a mixture of two or more thereof may be used. Also, the metal for a positive electrode active material may specifically include at least one metallic element selected from the group consisting of nickel, cobalt, manganese, and aluminum.

The metal precursor for a positive electrode active material may be prepared by a conventional preparation method. For example, in a case in which the metal precursor for a positive electrode active material is prepared by a co-precipitation method, the metal precursor for a positive electrode active material may be prepared through a co-precipitation reaction by adding an ammonium cation-containing complexing agent and a basic compound to an aqueous solution of a raw material containing the metal for a positive electrode active material.

In this case, the raw material containing the metal for a positive electrode active material may be determined according to a composition of the lithium composite metal oxide constituting the desired active material. Specifically, a hydroxide, oxyhydroxide, nitrate, halide, carbonate, acetate, oxalate, citrate, or sulfate, which includes the metal constituting the lithium composite metal oxide, may be used. The metal for a positive electrode active material may be at least one selected from the group consisting of Fe, Ni, Co, Mn, Cr, Zr, Nb, Cu, V, Mo, Ti, Zn, Al, Ga, and Mg, or a mixed metal of two or more thereof, and, for example, may be at least one selected from the group consisting of Ni, Co, Mn, and Al, or a mixed metal of two or more thereof.

Specifically, in a case in which the positive electrode active material includes a lithium-nickel-cobalt-manganese-based compound as the lithium composite metal oxide, a nickel (Ni)-containing raw material, a cobalt (Co)-containing raw material, and a manganese (Mn)-containing raw material may be used as the raw material for the preparation of the hydroxide containing the metal for a positive electrode active material, as a precursor thereof. The raw material containing each metallic element may be used without particular limitation as long as it is typically used during the preparation of a positive electrode active material. For example, the Co-containing raw material may specifically include $Co(OH)_2$, $CoO$, $CoOOH$, $Co(OCOCH_3)_2 \cdot 4H_2O$, $Co(NO_3)_2 \cdot 6H_2O$, or $Co(SO_4)_2 \cdot 7H_2O$, and any one of the above-described compounds or a mixture of two or more thereof may be used.

Also, the raw material containing the metal for a positive electrode active material may be used in an appropriate amount ratio in consideration of amounts of the metals in the lithium composite metal oxide in the finally prepared positive electrode active material.

Furthermore, the raw material containing the metal for a positive electrode active material may be dissolved in water; or a mixture of water and an organic solvent (specifically, alcohol etc.) which may be uniformly mixed with the water, and thus, it may be used as an aqueous solution.

Also, the ammonium cation-containing complexing agent, which may be used in the preparation of the hydroxide containing the metal for a positive electrode active material, may specifically include $NH_4OH$, $(NH_4)_2SO_4$, $NH_4NO_3$, $NH_4Cl$, $CH_3COONH_4$, or $NH_4CO_3$, and any one thereof or a mixture of two or more thereof may be used. Furthermore, the ammonium cation-containing complexing agent may be used in the form of an aqueous solution, and, in this case, water or a mixture of water and an organic solvent (specifically, alcohol etc.), which may be uniformly mixed with the water, may be used as a solvent.

Also, the basic compound, which may be used in the preparation of the hydroxide containing the metal for a positive electrode active material, may include a hydroxide of alkali metal or alkaline earth metal, such as $NaOH$, $KOH$, or $Ca(OH)_2$, or a hydrate thereof, and any one thereof or a mixture of two or more thereof may be used. The basic compound may also be used in the form of an aqueous solution, and, in this case, water or a mixture of water and an organic solvent (specifically, alcohol etc.), which may be uniformly mixed with the water, may be used as a solvent.

Also, the co-precipitation reaction for the formation of particles of the hydroxide containing the metal for a positive electrode active material may be performed under a condition in which a pH value of the aqueous solution of the metal-containing raw material is in a range of 8 to 14. For this purpose, it is desirable to appropriately adjust amounts of the ammonium cation-containing complexing agent and basic compound added. In this case, the pH value denotes a pH value measured at a liquid temperature of 25° C. Furthermore, the co-precipitation reaction may be performed in a temperature range of 30° C. to 60° C. in an inert atmosphere. As a result of the above-described co-precipitation reaction, the particles of the hydroxide containing the metal for a positive electrode active material, as the precursor, are formed and precipitated in the aqueous solution.

As described above, in the present invention, the metal precursor for a positive electrode active material prepared by the above-described preparation method may specifically be a secondary particle in which a plurality of primary particles are agglomerated, and, in this case, the primary particle may have a plate shape. In this case, a plate thickness of the primary particles may be controlled by adjusting a reaction rate in a preparation process.

Specifically, the metal precursor for a positive electrode active material may be a secondary particle in which a plurality of primary particles having an average plate thickness of 150 nm or less, for example, 80 nm to 130 nm are agglomerated, or may be a secondary particle in which a plurality of primary particles having an average plate thickness of greater than 150 nm, for example, 200 nm to 250 nm are agglomerated.

Also, an average particle diameter ($D_{50}$) of the secondary particulate metal precursor for a positive electrode active material may be in a range of 4 μm to 30 μm, for example, 10 μm to 20 μm. When the average particle diameter of the precursor is within the above range, more efficient application is possible. In the present invention, the average particle diameter ($D_{50}$) of the metal precursor for a positive electrode active material may be defined as a particle diameter at 50% in a cumulative particle diameter distribution. The average particle diameter ($D_{50}$) of the metal precursor for a positive electrode active material may be measured by using a laser diffraction method. Specifically, the metal precursor for a positive electrode active material is introduced into a laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

The precursor doped with various metallic elements is prepared by the above-described acoustic resonance treatment. In this case, the doping metallic elements may be uniformly distributed in the precursor, may be present with a concentration gradient in which a content distribution is increased or decreased from the particle center of the precursor to the surface thereof, or may be only present on a surface side of the precursor, according to positional preference of each metallic element and a crystal structure of the precursor material.

Next, in the method of preparing a positive electrode active material according to the embodiment of the present invention, step 2 is a step of preparing a positive electrode active material by mixing the doped precursor prepared in step 1 with a lithium raw material and then performing a heat treatment.

Specific examples of the lithium raw material may be a hydroxide, oxyhydroxide, nitrate, halide, carbonate, acetate, oxalate, or citrate including lithium, and any one thereof or a mixture of two or more thereof may be used. For example, the lithium raw material may include any one selected from the group consisting of $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, and $Li_3C_6H_5O_7$, or a compound of two or more thereof.

An amount of the lithium raw material used may be determined according to a lithium content in the finally prepared lithium composite metal oxide.

The mixing of the doped precursor with the lithium raw material may be performed by a conventional mixing method using a ball mill, a bead mill, a high-pressure homogenizer, a high-speed homogenizer, or an ultrasonic dispersing device, or may be performed by acoustic resonance as in the previous mixing for doping.

Specifically, in consideration of an effect of uniform mixing of the doped precursor with the lithium raw material, the mixing may be performed by acoustic resonance, may particularly be performed by applying an acoustic energy of 50 g to 90 g, and, more particularly, may be performed by applying an acoustic energy of 50 g to 90 g for 1 minute to 5 minutes. In this case, the unit "g" denotes a gravitational acceleration (100 g=980 m/s$^2$).

Also, an average particle diameter ratio of the doped precursor to the lithium raw material may be controlled to increase mixing efficiency during the mixing by acoustic resonance, and, specifically, the average particle diameter ratio of the doped precursor to the lithium raw material may be in a range of 10:1 to 3:1.

Subsequently, a primary heat treatment on a mixture of the doped precursor and the lithium raw material may be performed in a temperature range of 700° C. to 950° C. If the temperature during the primary heat treatment is less than 700° C., there is a concern that discharge capacity per unit weight may be reduced, cycle characteristics may be degraded, and operating voltage may be reduced due to the residue of unreacted raw materials, and, if the temperature during the primary heat treatment is greater than 950° C., there is a concern that the discharge capacity per unit weight may be reduced, the cycle characteristics may be degraded, and the operating voltage may be reduced due to the generation of side reaction products.

Furthermore, the primary heat treatment may be performed in air or an oxygen atmosphere, and may be performed for 5 hours to 30 hours. When the primary heat treatment is performed under the above-described conditions, a diffusion reaction between particles of the mixture may be sufficiently performed.

As a result of step 2, a positive electrode active material including lithium composite metal oxide particles, in which the lithium composite metal oxide present on the surface side of the particle is doped with a metallic element that is derived from the raw material including a doping element, is prepared.

Also, the method of preparing a positive electrode active material according to the embodiment of the present invention may further include a washing process of the product obtained after the primary heat treatment of step 2.

The washing process may be performed by using a conventional washing method such as mixing with water. Specifically, the washing process may be performed such that the mixing of the product with water is performed by mixing by acoustic resonance. The conventional washing method has a limitation in that a capillary phenomenon between agglomerated particles limits washing and characteristics of the positive electrode active material are degraded during over-washing. In contrast, in a case in which a washing process with water is performed using acoustic resonance, since particle dispersion is easy, washing may be performed with excellent efficiency and without limitation, and the degradation of the characteristics of the positive electrode active material may be prevented by adjusting washing time.

The acoustic resonance during the washing may be performed by applying an acoustic energy of 20 g to 90 g for 10 seconds to 30 minutes. When the acoustic resonance is performed under the above-described conditions, the unreacted raw materials and impurities remaining in the positive electrode active material may be removed with excellent efficiency and without worrying about the surface damage and loss of the positive electrode active material. In this case, the unit "g" denotes a gravitational acceleration (100 g=980 m/s$^2$).

Furthermore, the method of preparing a positive electrode active material according to the embodiment of the present invention may further include a surface treatment process of the product obtained after the heat treatment of step 2 or the washing process.

The surface treatment process may be performed by a conventional method and, specifically, may be performed by mixing the product obtained after the heat treatment with a surface treatment agent using acoustic resonance and then performing an additional heat treatment (hereinafter, referred to as a "secondary heat treatment").

In a case in which the heat treatment is performed after mixing the surface treatment agent with raw material Me (where Me is at least one element selected from the group consisting of Al, Y, B, W, hafnium (Hf), Nb, Ta, Mo, silicon (Si), tin (Sn), and Zr), an acetate, nitrate, sulfate, halide, sulfide, hydroxide, oxide, or oxyhydroxide including Me may be used as the raw material Me. For example, in a case in which the Me is B, the raw material Me may include boric acid, lithium tetraborate, boron oxide, and ammonium borate, and any one thereof or a mixture of two or more thereof may be used. Also, in a case in which the Me is tungsten, the raw material Me may include tungsten oxide (VI).

A uniform surface treatment layer may be formed on the surface of the positive electrode active material with better efficiency by using acoustic resonance during the surface treatment. Specifically, an acoustic resonance treatment for the formation of the surface treatment layer may be performed by applying an acoustic energy of 30 g to 100 g for 1 minute to 30 minutes. In this case, the unit "g" denotes a gravitational acceleration (100 g=980 m/s$^2$).

Also, the secondary heat treatment for the formation of the surface treatment layer may be performed in a temperature range of 300° C. to 900° C. The secondary heat treatment temperature may depend on a melting point reaction temperature of the raw material Me. If the secondary heat treatment temperature is less than 300° C., the surface treatment layer is not sufficiently formed, and, if the secondary heat treatment temperature is greater than 900° C., there is a concern that side reaction products may be generated due to over-sintering.

Furthermore, an atmosphere during the heat treatment is not particularly limited, but the heat treatment may be performed in a vacuum, inert, or air atmosphere.

A surface treatment layer including a compound of the following Formula 1 may be formed on the surface of the active material by the above-described surface treatment process:

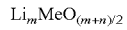   [Formula 1]

(in Formula 1, Me is at least one element selected from the group consisting of Al, Y, B, W, Hf, Nb, Ta, Mo, Si, Sn, and Zr, 2≤m≤10, and n is the oxidation number of Me)

With respect to the positive electrode active material prepared according to the above-described preparation method, structural stability is significantly improved by allowing the doping element to be uniformly dispersed or doped in comparison to doping by a conventional dry mixing method or wet mixing method, and, as a result, capacity reduction may be minimized when used in the battery. Simultaneously, output characteristics, rate capability, and cycle characteristics may be further improved.

According to another embodiment of the present invention, provided is a positive electrode active material prepared by the above-described preparation method.

Specifically, the positive electrode active material includes a lithium composite metal oxide doped with the doping element. For example, the lithium composite metal oxide doped with the doping element may be uniformly distributed in the precursor, may be present with a concentration gradient in which a content distribution is increased or decreased from the particle center of the precursor to the surface thereof, or may be only present on the surface side of the precursor.

In the present invention, the expression "surface side" of the lithium composite metal oxide particle denotes a region near the surface excluding the center of the particle, particularly denotes a region corresponding to 0% to less than 100% of a distance from the surface of the lithium composite metal oxide particle to the center thereof, i.e., a radius of the lithium composite metal oxide particle, more particularly 0% to 50% of the distance from the particle surface, and, for example, 0% to 30% of the distance from the particle surface.

Specifically, the lithium composite metal oxide doped with the metallic element of the ceramic ion conductor may be a compound of the following Formula 2:

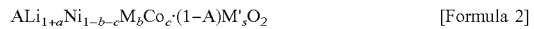   [Formula 2]

In formula 2,

M is at least one metallic element selected from the group consisting of Mn and Al, and M' is a metallic element derived from the raw material including a doping element, wherein M' may particularly be any one selected from the group consisting of Y, Zr, La, Sr, Ga, Mg, Sc, Gd, Sm, Ca, Ce, Fe, Al, Ti, Ta, Nb, W, Mo, and Cr, or a mixed element of two or more thereof, more particularly may be any one selected from the group consisting of Y, Zr, La, Sr, Ga, Sc, Gd, Sm, and Ce, or a mixed element of two or more thereof, and, for example, may be at least one element selected from the group consisting of Y and Zr, but M and M' may be different elements from each other.

Also, in Formula 2, 0<A<1, 0≤a≤0.33, 0≤b≤0.5, 0≤c≤0.5, and 0<s≤0.2, but b and c are not 0.5 at the same time. Specifically, under conditions satisfying the above-described A, b, c, and s, 0≤a≤0.09, and, for example, under conditions satisfying the b, c, and s, 0.9<A<1, and a=0. In a case in which a is greater than 0.33 in Formula 2, an effect of doping the lithium composite metal oxide particles with the raw material including a doping element may not be significant in comparison to a case where the lithium composite metal oxide particles are doped with a metallic element by a conventional doping method, for example, a difference in effects on life characteristics is within about 10%. In contrast, in a case in which a is 0.09 or less, particularly, 0 in Formula 2, the effect of doping the lithium composite metal oxide particles with the raw material including a doping element may be significant in comparison to the case where the lithium composite metal oxide particles are doped with the metallic element by the conventional doping method, for example, the difference in effects on life characteristics is in a range of 30% to 70%.

Furthermore, in Formula 2, M' may also be distributed in a concentration gradient that gradually decreases from the particle surface to the center in the lithium composite metal oxide particle. Since the metal is distributed in a concentration gradient in which a concentration of the doping metal is gradually changed according to a position in the positive electrode active material particle, an abrupt phase boundary region is not present in the active material, and thus, a crystal structure is stabilized and thermal stability is increased. Also, in a case in which the doping element has a concentration gradient in which the doping element is distributed at a high concentration on the surface side of the active material particle and the concentration is gradually decreased to the center of the particle, the capacity reduction may be prevented while the thermal stability is exhibited.

Specifically, in the positive electrode active material according to the embodiment of the present invention, in a case in which the doping element M' has a concentration gradient, a difference in the concentration of the M' between a region within 10 vol % from the particle surface (hereinafter, simply referred to as a '$Rs_{10}$ region') and a region within 10 vol % from the particle center (hereinafter, simply referred to as a '$Rc_{10}$ region') may be in a range of 10 at % to 90 at % based on a total atomic weight of the doping element M' included in the positive electrode active material, and a difference in the concentration of the M" may be in a range of 10 at % to 90 at %.

In the present invention, the concentration and concentration gradient structure of the doping element in the positive electrode active material particle may be identified by using a method such as electron probe microanalysis (EPMA), inductively coupled plasma-atomic emission spectroscopy (ICP-AES), or time of flight secondary ion mass spectrometry (ToF-SIMS), and, specifically, an atomic ratio of each metal may be measured by using EPMA while moving from the center of the positive electrode active material to the surface thereof.

Also, in a case in which the metal precursor composed of the primary particles having a plate thickness of greater than 150 nm is used during the preparation of the positive electrode active material, the positive electrode active material according to the embodiment of the present invention may further include a surface treatment layer composed of the lithium composite metal oxide of Formula 2. The surface treatment layer may be formed on the surface of the lithium composite metal oxide particle to have a thickness ratio of 0.001 to 0.1 with respect to the radius of the lithium composite metal oxide particle, and, for example, may be formed in a thickness range of 1 nm to 1,000 nm.

The positive electrode active material according to the embodiment of the present invention may be primary particles of the lithium composite metal oxide, or may be a secondary particle in which the primary particles are assembled. In a case in which the positive electrode active material is the primary particles, since the formation of surface impurities, such as $Li_2CO_3$ and LiOH, due to a reaction with moisture or $CO_2$ in the air is reduced, there are low risks of battery capacity reduction and gas generation and excellent high-temperature stability may be achieved. Also, in a case in which the positive electrode active material is the secondary particle in which the primary particles are assembled, the output characteristics may be better. Furthermore, in the case that the positive electrode active material is the secondary particle, an average particle diameter ($D_{50}$) of the primary particles may be in a range of 10 nm to 200 nm. The type of the active material particles may be appropriately determined according to the composition of the lithium composite metal oxide constituting the active material.

According to another embodiment of the present invention, provided is a positive electrode which includes the positive electrode active material prepared by the above-described preparation method.

The positive electrode may be prepared by a typical positive electrode preparation method known in the art except that the above-described positive electrode active material is used. For example, a binder, a conductive agent, or a dispersant, if necessary, as well as a solvent is mixed with the positive electrode active material and stirred to prepare a slurry, a positive electrode collector is then coated with the slurry and dried to form a positive electrode active material layer, and thus, the positive electrode may be prepared.

Any metal may be used as the positive electrode collector so long as it is a metal having high conductivity as well as no reactivity in a voltage range of the battery to which the slurry of the positive electrode active material may be easily adhered. Non-limiting examples of the positive electrode collector may include aluminum, nickel, or a foil prepared by a combination thereof.

Also, the solvent for forming the positive electrode may include an organic solvent, such as N-methylpyrrolidone (NMP), dimethylformamide (DMF), acetone, and dimethylacetamide, or water, and these solvents may be used alone or in a mixture of two or more thereof. An amount of the solvent used may be sufficient if the solvent may dissolve and disperse the positive electrode active material, the binder, and the conductive agent in consideration of a coating thickness of the slurry and manufacturing yield.

Various types of binder polymers, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, poly (acrylic acid), polymers in which hydrogens thereof are substituted with lithium (Li), sodium (Na), or Ca, or various copolymers, may be used as the binder. The binder may be included in an amount of 1 wt % to 30 wt % based on a total weight of the positive electrode active material layer.

Any conductive agent may be used without particular limitation so long as it has suitable conductivity without causing adverse chemical changes in the battery, and, for example, the conductive agent may include graphite such as natural graphite or artificial graphite; a carbon-based material such as carbon black, acetylene black, Ketjen black, channel black, furnace black, lamp black, thermal black, carbon nanotubes, or carbon fibers; metal powder such as copper powder, nickel powder, aluminum powder, and silver powder or metal fibers; fluorocarbon and conductive whiskers such as zinc oxide whiskers or potassium titanate whiskers; conductive metal oxide such as titanium oxide; or conductive polymers, such as polyphenylene derivatives, and any one thereof or a mixture of two or more thereof may be used. The conductive agent may be included in an amount of 1 wt % to 30 wt % based on the total weight of the positive electrode active material layer.

According to another embodiment of the present invention, provided is a lithium secondary battery which includes the positive electrode active material prepared by the above-described preparation method.

The lithium secondary battery specifically includes the positive electrode, a negative electrode, and a separator disposed between the positive electrode and the negative electrode.

A carbon material, lithium metal, silicon, or tin, which may intercalate and deintercalate lithium ions, may be typically used as a negative electrode active material that is used in the negative electrode. For example, the carbon material may be used, and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes. Also, a negative electrode collector is generally fabricated to have a thickness of 3 µm to 500 µm. The negative electrode collector is not particularly limited so long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Furthermore, similar to the positive electrode collector, the negative electrode collector may have a fine roughness surface to improve bonding strength of a negative electrode active material, and may be used in various shapes such as a film, a sheet, a foil, a net, a porous body, a foam body, a non-woven fabric body, and the like.

Similar to the positive electrode, a binder and a conductive agent, which are typically used in the art, may be used in the negative electrode. A negative electrode active material and the above additives are mixed and stirred to prepare a negative electrode active material slurry, and the current collector is then coated therewith and pressed to prepare the negative electrode.

Also, a typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Furthermore, a typical porous nonwoven fabric, for example, a nonwoven fabric formed of high melting point glass fibers or polyethylene terephthalate fibers may be used, but the present invention is not limited thereto.

An electrolyte used in the present invention may include an organic liquid electrolyte, an inorganic liquid electrolyte, a solid polymer electrolyte, a gel-type polymer electrolyte, a solid inorganic electrolyte, and a molten inorganic electrolyte, which may be used in the preparation of a lithium secondary battery, but the present invention is not limited thereto.

A lithium salt, which may be included as the electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3-$, $CF_3CF_2SO_3-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

An electrode assembly is prepared by disposing the separator between the positive electrode and the negative electrode, the electrode assembly is disposed in a case, and a lithium secondary battery having the above-described configuration may then be prepared by injecting an electrolyte solution into the case.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles.

Thus, according to another embodiment of the present invention, provided are a battery module including the lithium secondary battery as a unit cell, and a battery pack including the battery module.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLE 1-1

Preparation of Positive Electrode Active Material

After yttria-stabilized zirconia (YSZ) nanopowder ($D_{50}$=50 nm) was added to a $Ni_{0.83}Co_{0.11}Mn_{0.06}(OH)_2$ precursor ($D_{50}$=15 µm, average plate thickness of plate-shaped primary particles=95 nm) in a concentration of 2,000 ppm, an acoustic energy of 60 g was applied for 2 minutes using an acoustic mixer (LabRAM II) to obtain a precursor which was doped with ceramic elements (Y and Zr) derived from a raw material including a YSZ doping element.

After LiOH was added to the doped precursor in a molar ratio of 1.02 and mixing was performed at 15,000 rpm for 10 minutes using a blending mixer, a heat treatment was performed at 800° C. in an oxygen atmosphere to prepare a positive electrode active material of lithium composite metal oxide doped with Y and Zr.

COMPARATIVE EXAMPLE 1-1

Preparation of Positive Electrode Active Material

After YSZ nanopowder ($D_{50}$=50 nm) was added to a $Ni_{0.83}Co_{0.11}Mn_{0.06}(OH)_2$ precursor ($D_{50}$=15 µm, average plate thickness of plate-shaped primary particles=95 nm) in a concentration of 2,000 ppm, mixing was performed at 15,000 rpm for 10 minutes using a blending mixer to obtain a doped precursor.

After LiOH was added to the mixed precursor in a molar ratio of 1.02 and mixing was performed at 15,000 rpm for 10 minutes using a blending mixer, a secondary heat treatment was performed at 800° C. in an oxygen atmosphere to prepare a positive electrode active material.

COMPARATIVE EXAMPLE 1-2

Preparation of Positive Electrode Active Material

YSZ nanopowder ($D_{50}$=50 nm) was added in a concentration of 2,000 ppm, while deionized water was stirred with a mechanical stirrer, to prepare a mixture in a homogeneous state. Thereafter, a $Ni_{0.83}Co_{0.11}Mn_{0.06}(OH)_2$ precursor ($D_{50}$=15 µm, average plate thickness of plate-shaped primary particles=95 nm) was added thereto and mixed at 50 rpm for 30 minutes. The mixed solution was filtered and then dried at 130° C. for 12 hours.

After LiOH was added to the resulting product in a molar ratio of 1.02 and mixing was performed at 15,000 rpm for 10 minutes using a blending mixer, sintering was performed at 800° C. in an oxygen atmosphere to prepare a positive electrode active material.

EXPERIMENTAL EXAMPLE 1

Figure 2:
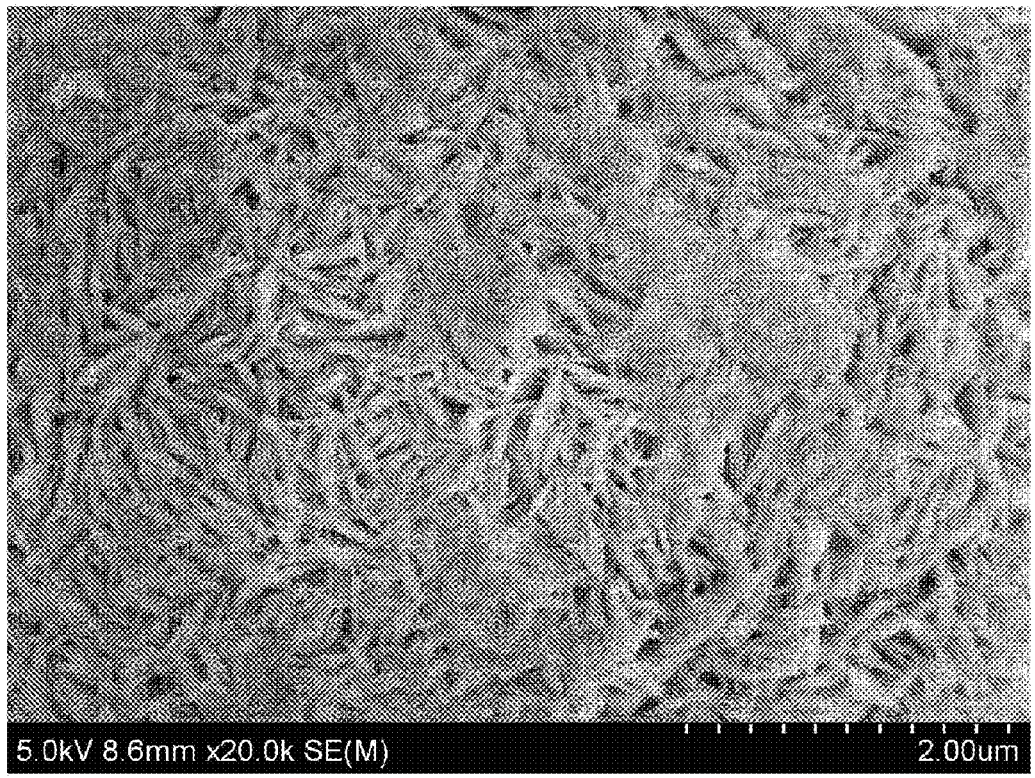
FIG. 2 is an SEM image of a doping precursor prepared in Comparative Example 1-1.
Figure 3:
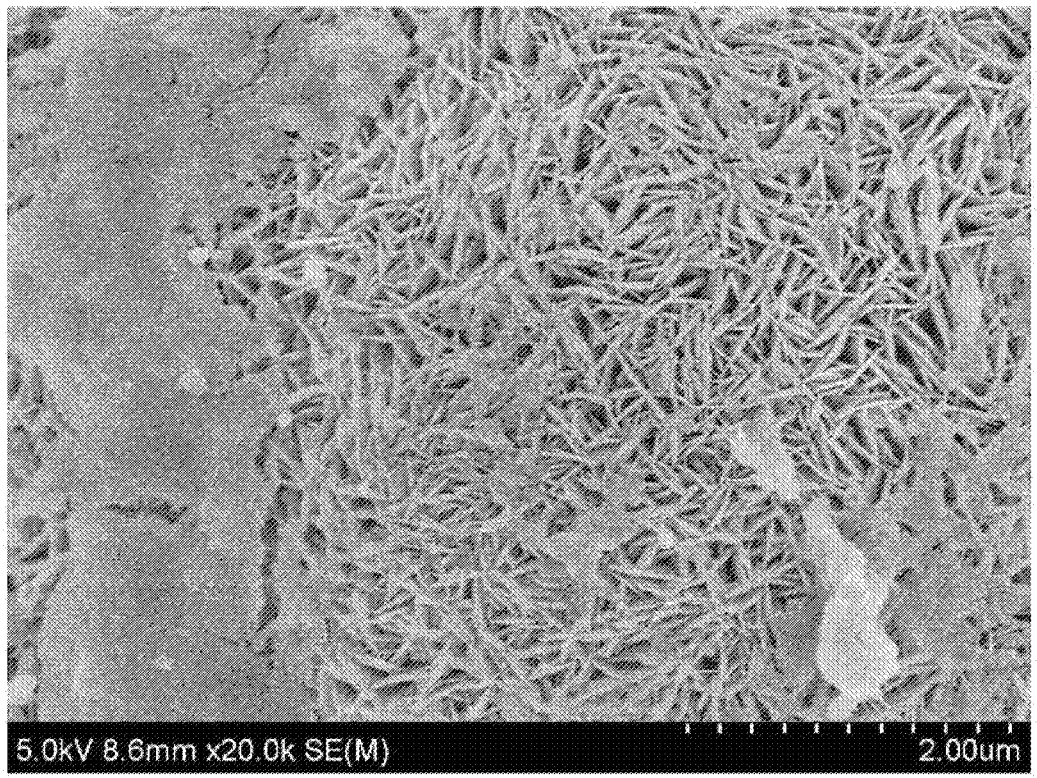
FIG. 3 is an SEM image of a doping precursor prepared in Comparative Example 1-2.

During the preparation of the positive electrode active materials of Example 1-1 and Comparative Examples 1-1 and 1-2, the doped precursors were observed with a scanning electron microscope. The results thereof are presented in the following FIGS. 1 to 3, respectively.

From the results, it may be confirmed that, in a case in which an acoustic mixing method was used, it was more advantageous to dispersion so that agglomeration was low and the surface of the precursor was more uniformly doped in comparison to conventional dry process (Comparative Example 1-1) and wet process (Comparative Example 1-2). Also, it may be confirmed that there was no surface damage to the precursor and process time was also reduced.

EXAMPLES 1-2 AND 1-3, AND COMPARATIVE EXAMPLES 1-3 AND 1-4

Preparation of Positive Electrode Active Materials

Positive electrode active materials were prepared in the same manner as in Example 1-1 except that particle diameters of the precursor particles and the raw material including a doping element were variously changed as listed in the following Table 1.

TABLE 1

| | Example 1-2 | Example 1-3 | Comparative Example 1-3 | Comparative Example 1-4 |
|---|---|---|---|---|
| Average plate thickness of primary particles in metal precursor (nm) | 100 | 230 | 100 | 230 |
| Average particle diameter ($D_{50}$) of metal precursor (μm) | 15 | 15 | 15 | 15 |
| Average particle diameter ($D_{50}$) of raw material including doping element (μm) | 2 | 3 | 3.5 | 4 |

In Table 1, the average plate thickness of the primary particles in the prepared metal precursor was observed and measured by using a scanning electron microscope, and the average particle diameter of the secondary particulate metal precursor and the average particle diameter of the raw material including a doping element were calculated from each average particle diameter ($D_{50}$) at 50% in a cumulative particle diameter distribution of the measurement instrument after the metal precursor and the raw material including a doping element were respectively introduced into a laser diffraction particle size measurement instrument (e.g., Microtrac MT 3000) and irradiated with ultrasonic waves having a frequency of about 28 kHz and an output of 60 W.

Figure 4:
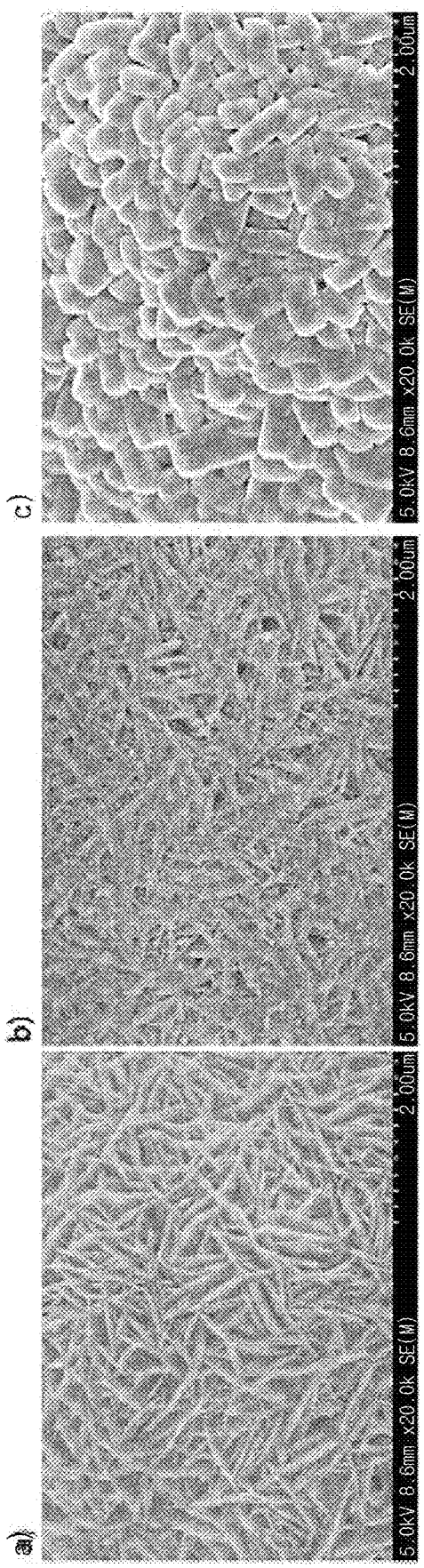
FIG. 4 is SEM images of (a) metal precursor, (b) doped precursor, and (c) positive electrode active material during the preparation of the positive electrode active material according to Example 1-2.
Figure 5:
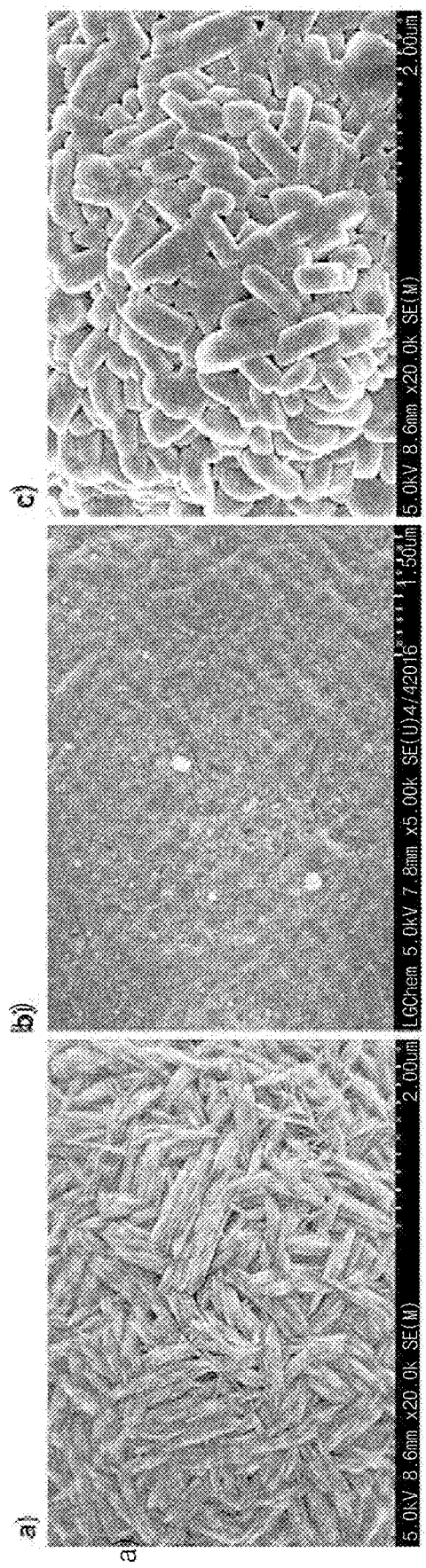
FIG. 5 is SEM images of (a) metal precursor, (b) doped precursor, and (c) positive electrode active material during the preparation of the positive electrode active material according to Example 1-3.
Figure 6:
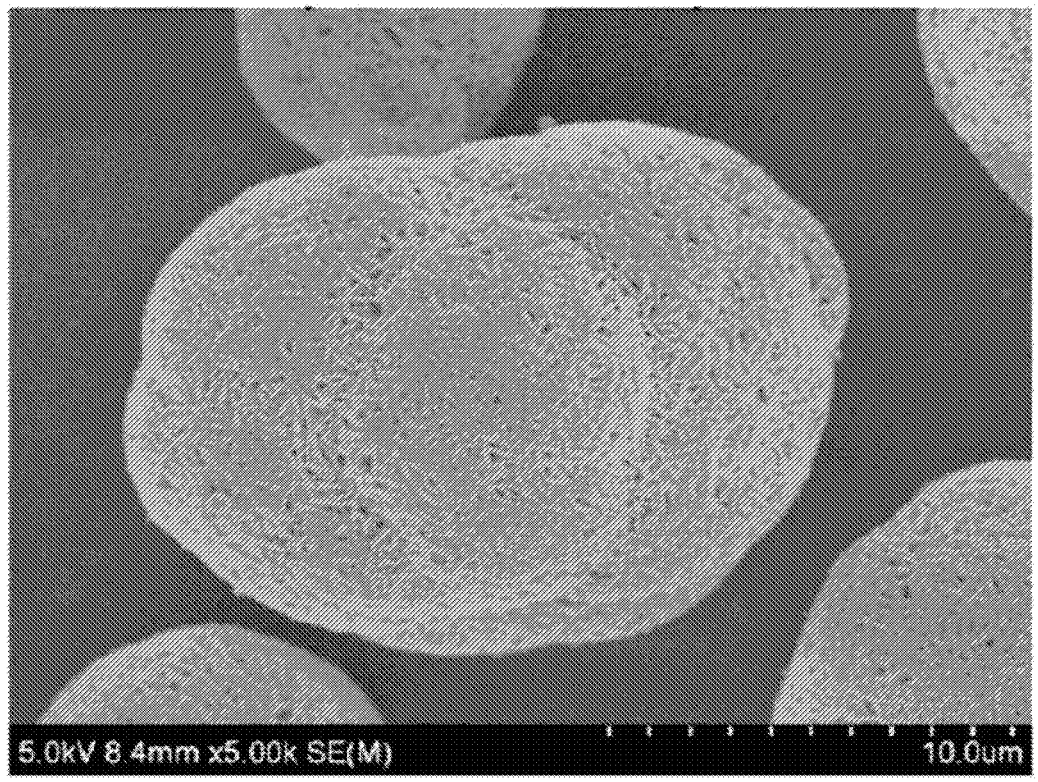
FIG. 6 is an SEM image of a doping precursor obtained after an acoustic resonance treatment on a mixture of a metal precursor and a raw material including a doping element in Example 1-2.
Figure 7:
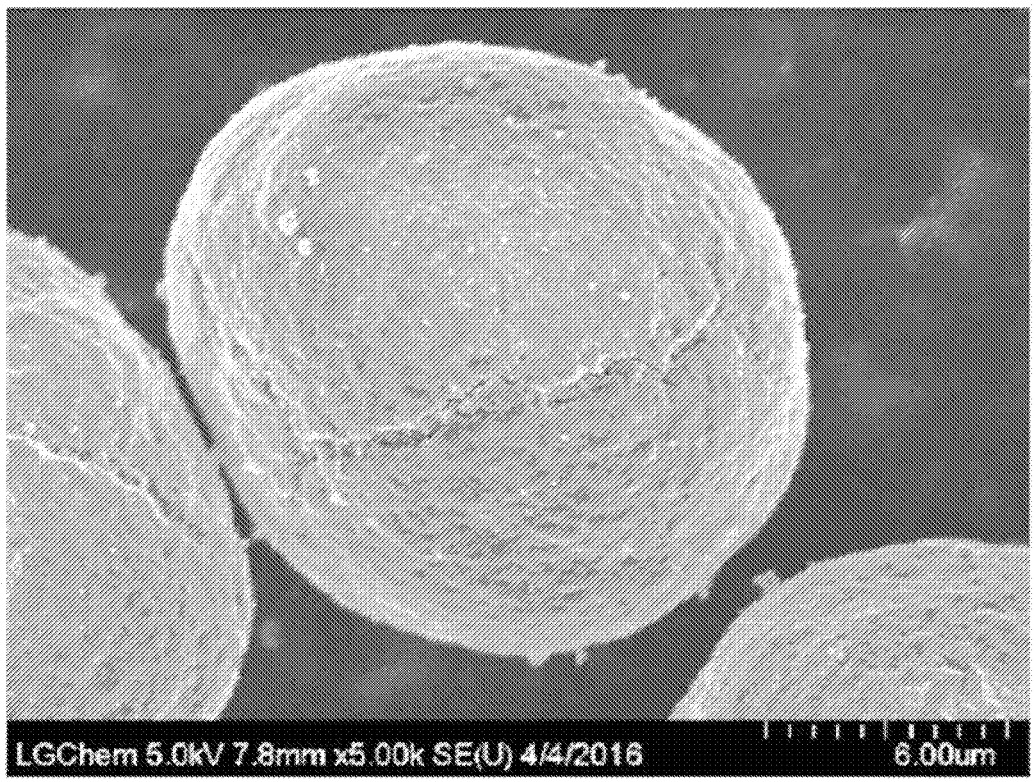
FIG. 7 is an SEM image of a doping precursor obtained after an acoustic resonance treatment on a mixture of a metal precursor and a raw material including a doping element in Example 1-3.
Figure 8:
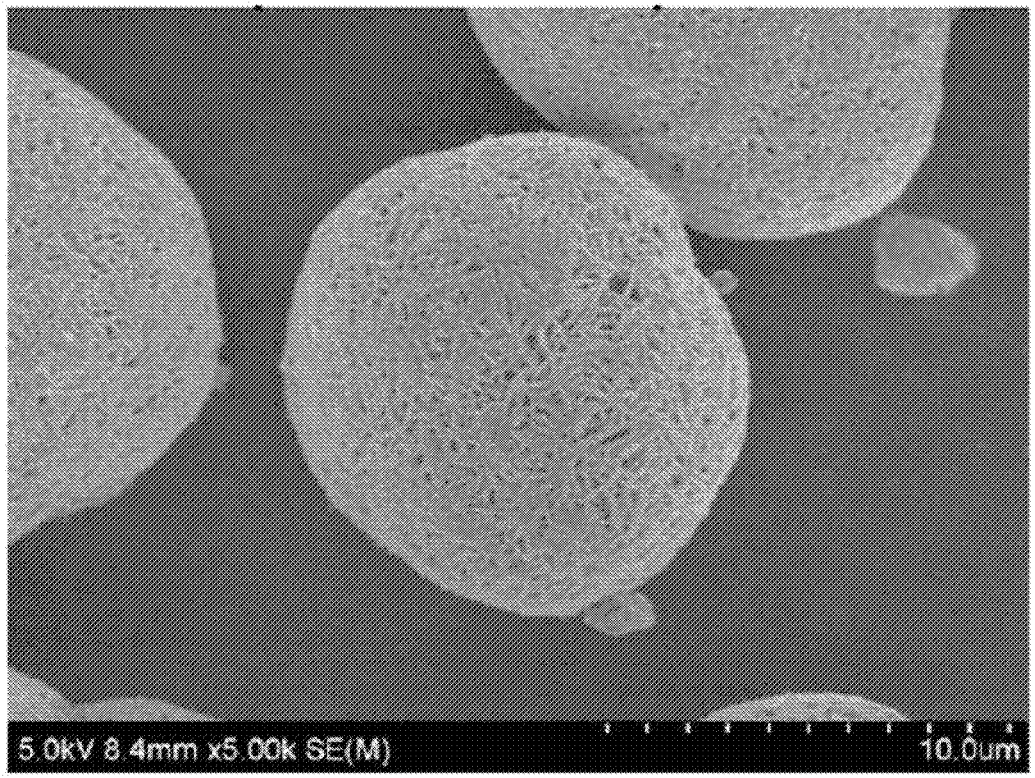
FIG. 8 is an SEM image of a doping precursor obtained after an acoustic resonance treatment on a mixture of a metal precursor and a raw material including a doping element in Comparative Example 1-3.
Figure 9:
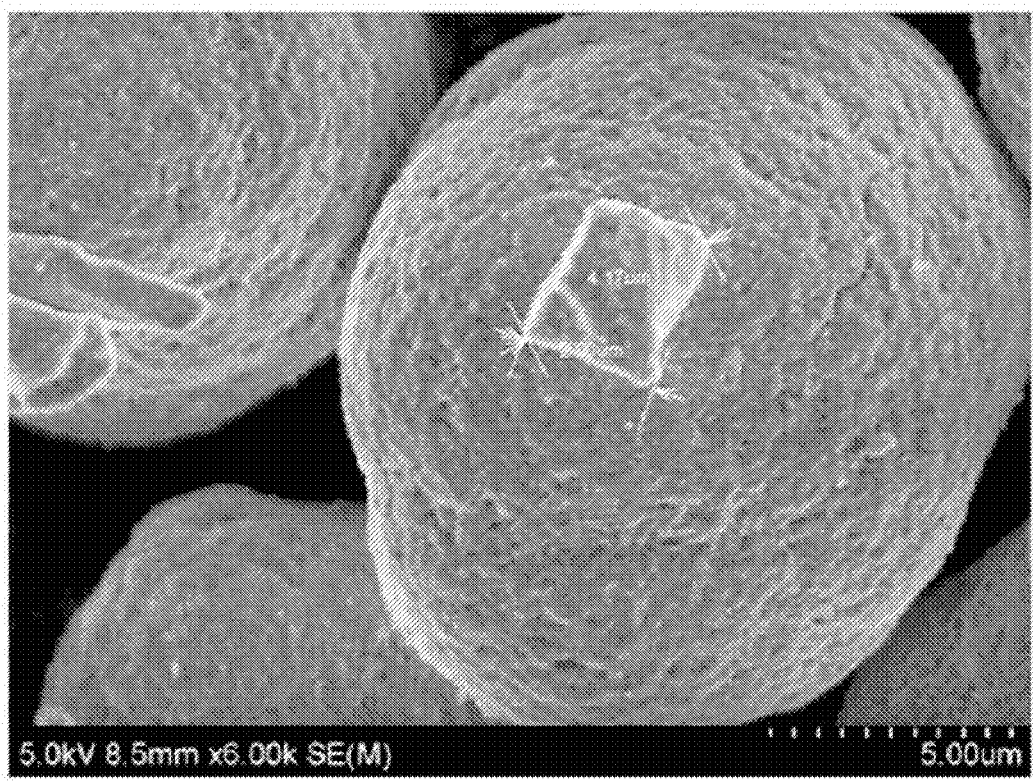
FIG. 9 is an SEM image of a doping precursor obtained after an acoustic resonance treatment on a mixture of a metal precursor and a raw material including a doping element in Comparative Example 1-4.

Also, during the preparation of the positive electrode active materials of Example 1-2 and Example 1-3, the metal precursor (a) used, the precursor (b) doped after the doping process, and the finally prepared positive electrode active material (c) were respectively observed with an SEM. The results thereof are presented in FIGS. 4 and 5.

EXPERIMENTAL EXAMPLE 2

The precursors prepared in Examples 1-2 and 1-3 and Comparative Examples 1-3 and 1-4 were observed with an SEM, and the results thereof are presented in FIGS. 6 to 9.

From the results, with respect to Examples 1-2 and 1-3 in which the metal precursor having a $D_{50}$ of 15 μm was mixed with the raw materials including a doping element which had a $D_{50}$ of 2 μm and 3 μm, respectively, it may be confirmed that the precursors in a homogeneous state were observed due to uniform mixing. In contrast, with respect to Comparative Examples 1-3 and 1-4 in which the metal precursors and the raw materials including a doping element, which had the average particle diameters that did not satisfy the condition in which an average particle diameter ratio of the metal precursor particle to the raw material including a doping element was in a range of 5:1 to 2,000:1, were used, it may be confirmed that the raw material including a doping element was partially agglomerated and distributed on the surface of the precursor, and it was observed that the doping material was agglomerated and partially present.

EXAMPLE 1-4

Preparation of Positive Electrode Active Material

After yttria-stabilized zirconia (YSZ) nanopowder ($D_{50}$=50 nm) was added in a concentration of 2,000 ppm and $Al_2O_3$ nanopowder ($D_{50}$=50 nm) was added in a concentration of 2,000 ppm to a $Ni_{0.83}Co_{0.11}Mn_{0.06}(OH)_2$ precursor ($D_{50}$=15 μm, average plate thickness of plate-shaped primary particles=95 nm), an acoustic energy of 60 g was applied for 2 minutes using an acoustic mixer (LabRAM II) to obtain a precursor which was compositely doped with $Al_2O_3$ and ceramic elements (Y and Zr) derived from a raw material including a YSZ doping element.

After LiOH was added to the doped precursor in a molar ratio of 1.02 and mixing was performed by applying an acoustic energy of 80 g for 2 minutes using an acoustic mixer (LabRAM II), a heat treatment was performed at 800° C. in an oxygen atmosphere to prepare a positive electrode active material of lithium composite metal oxide doped with Y, Zr, and Al.

COMPARATIVE EXAMPLE 1-5

Preparation of Positive Electrode Active Material

After yttria-stabilized zirconia (YSZ) nanopowder ($D_{50}$=50 nm) was added in a concentration of 2,000 ppm and $Al_2O_3$ nanopowder ($D_{50}$=50 nm) was added in a concentration of 2,000 ppm to a $Ni_{0.83}Co_{0.11}Mn_{0.06}(OH)_2$ precursor ($D_{50}$=15 μm, average plate thickness of plate-shaped primary particles=95 nm), mixing was performed at 15,000 rpm for 10 minutes using a blending mixer to obtain a precursor which was compositely doped with $Al_2O_3$ and ceramic elements (Y and Zr) derived from a raw material including a YSZ doping element.

After LiOH was added to the doped precursor in a molar ratio of 1.02 and mixing was performed at 15,000 rpm for 10 minutes using a blending mixer, a secondary heat treatment was performed at 800° C. in an oxygen atmosphere to prepare a positive electrode active material of lithium composite metal oxide doped with Y, Zr, and Al.

EXPERIMENTAL EXAMPLE 3

Figure 10:
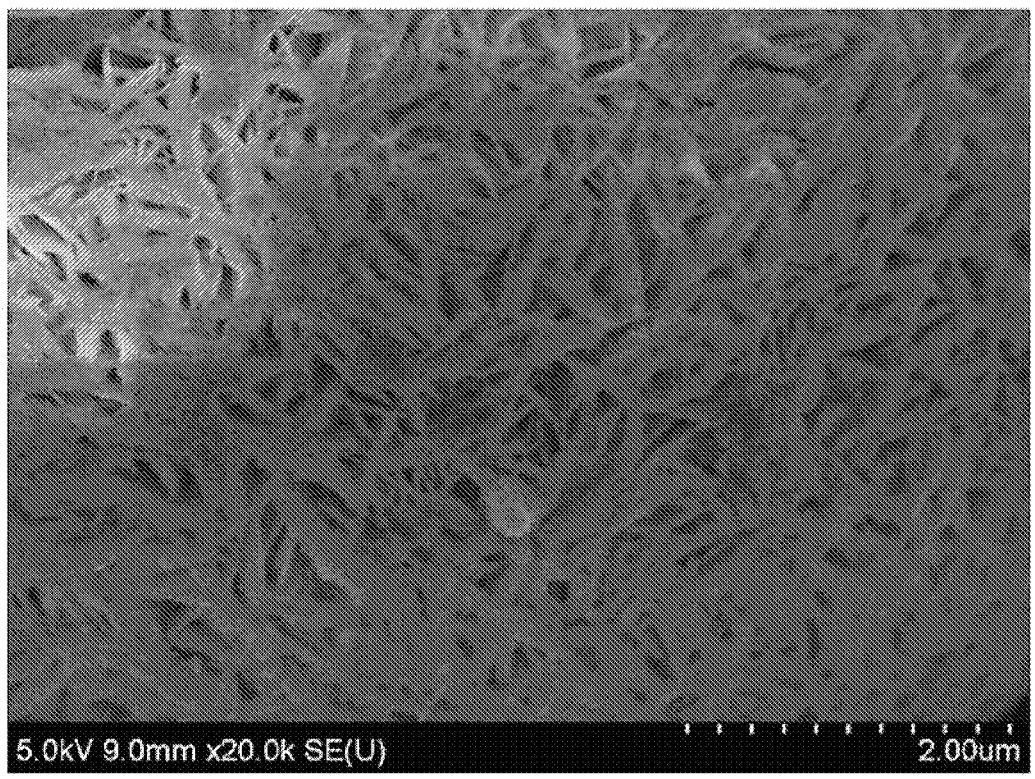
FIG. 10 is an SEM image of a product obtained after mixing a doped precursor with a lithium raw material during a preparation process of a positive electrode active material according to Example 1-4.
Figure 11:
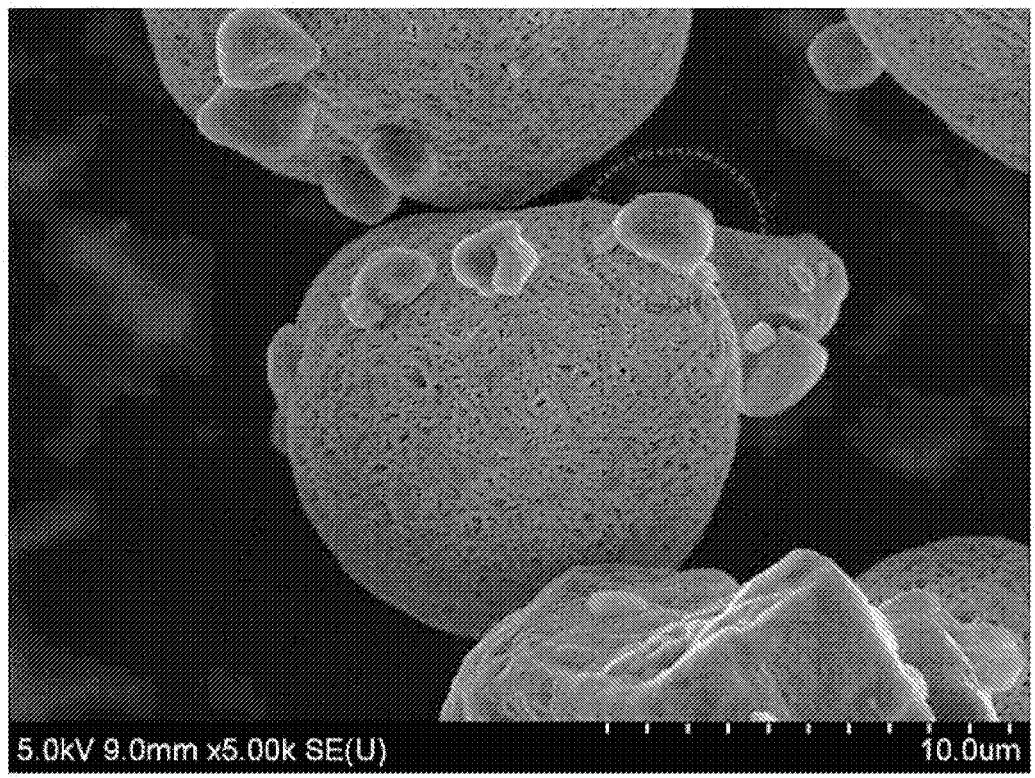
FIG. 11 is an SEM image of a product obtained after mixing a doped precursor with a lithium raw material during a preparation process of a positive electrode active material according to Comparative Example 1-1.

The product obtained after the mixing of the doped precursor and the lithium raw material in Example 1-4 was observed with an SEM before the heat treatment. The results thereof are presented in FIG. 10. For comparison, the product obtained after the mixing of the doped precursor and the lithium raw material during the preparation of the positive electrode active material according to Comparative Example 1-1 was also observed with an SEM, and the results thereof are presented in FIG. 11.

From the observation results, with respect to Example 1-4, the doped precursor and the lithium raw material were uniformly mixed so that the lithium raw material was uniformly dispersed and coated on the surface of the precursor particle in comparison to the blending mixing process in Comparative Example 1-1 even though acoustic mixing process time for the doped precursor and the lithium raw material was short. Also, damage to the surface and bulk of the doped precursor particle was also not observed. Thus, it may be confirmed that a positive electrode active material having better surface properties may be prepared without surface damage by applying acoustic resonance during the mixing with the lithium raw material after the doping in addition to the process of preparing the doped precursor during the preparation of the doped positive electrode active material.

EXPERIMENTAL EXAMPLE 4

The positive electrode active material prepared in Example 1-4, super P as a conductive agent, and PVDF as a binder were mixed in a weight ratio of 92.5:2.5:5 to prepare a composition for forming a positive electrode. An aluminum foil was coated therewith, was uniformly pressed by using a roll press, and was then vacuum dried at 130° C. for 12 hours in a vacuum oven to prepare a positive electrode for a lithium secondary battery. A standard 2032 half coin cell was prepared by using the positive electrode and capacity characteristics were then evaluated. In this case, a half coin cell was prepared by using the positive electrode active material prepared in Comparative Example 1-5 and was used for comparison.

Figure 12:
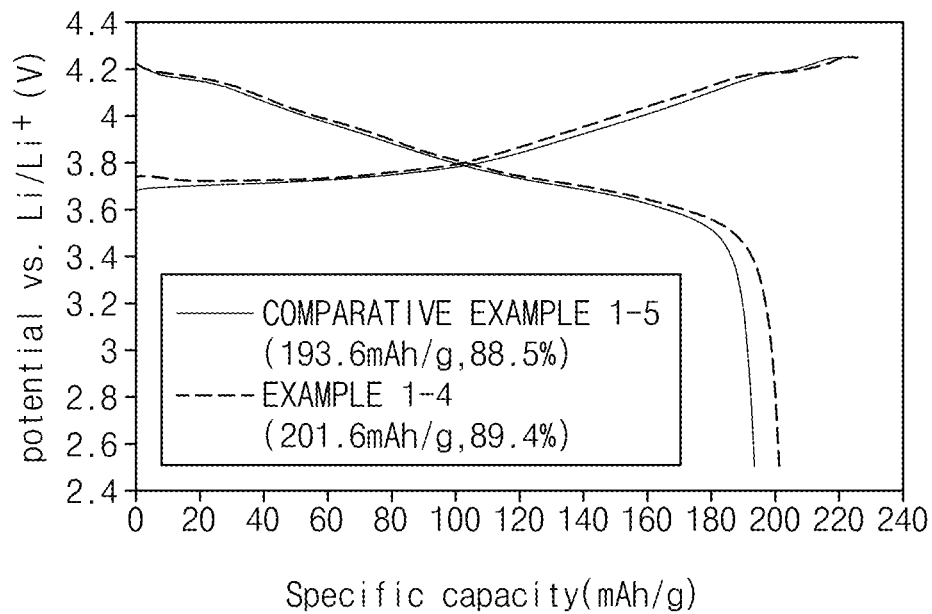
FIG. 12 is a graph illustrating discharge characteristics of half coin cells including positive electrode active materials prepared in Example 1-4 and Comparative Example 1-5.

Specifically, with respect to the capacity characteristics, the lithium secondary batteries were charged at a constant current (CC) of 0.2 C to a voltage of 4.25 V at 25° C., and thereafter, charge in the first cycle was performed by charging the lithium secondary batteries at a constant voltage (CV) of 4.25 V to a current of 0.05 mAh. After the batteries were left standing for 20 minutes, the batteries were discharged at a constant current of 0.2 C to a voltage of 2.5 V. Accordingly, discharge capacity was evaluated and compared. The results thereof are presented in the following Table 2 and FIG. 12.

TABLE 2

| | Discharge capacity (mAh/g) | Discharge efficiency (%) |
|---|---|---|
| Comparative Example 1-5 | 193.6 | 88.5 |
| Example 1-4 | 201.6 | 89.4 |

In general, if doping is performed on a positive electrode active material, capacity characteristics of a battery is reduced and, additionally, since particles capable of acting as impurities are formed on a surface due to the residue and agglomeration of a non-uniform doping material or doping raw material, battery characteristics may be degraded. From the experimental results, the battery including the positive electrode active material of Example 1-4 exhibited higher capacity characteristics than Comparative Example 1-5, and, thus, it may be understood that doping efficiency in the positive electrode active material prepared by the preparation method according to the present invention was higher.

EXAMPLE 1-5

Preparation of Positive Electrode Active Material

After yttria-stabilized zirconia (YSZ) nanopowder ($D_{50}$=50 nm) was added in a concentration of 2,000 ppm and $Al_2O_3$ nanopowder ($D_{50}$=50 nm) was added in a concentration of 2,000 ppm to a $Ni_{0.83}Co_{0.11}Mn_{0.06}(OH)_2$ precursor ($D_{50}$=15 μm, average plate thickness of plate-shaped primary particles=95 nm), an acoustic energy of 60 g was applied for 2 minutes using an acoustic mixer (LabRAM II) to obtain a precursor which was compositely doped with $Al_2O_3$ and ceramic elements (Y and Zr) derived from a raw material including a YSZ doping element.

After LiOH was added to the doped precursor in a molar ratio of 1.03 and mixing was performed by applying an acoustic energy of 80 g for 2 minutes using an acoustic mixer (LabRAM II), a heat treatment was performed at 780° C. in an oxygen atmosphere. After the product obtained after the heat treatment was dispersed in deionized water, it was washed by applying an acoustic energy of 40 g for 5 minutes using an acoustic mixer (LabRAM II), was filtered for 3 minutes or more, and was then dried at 130° C. for 12 hours or more in a vacuum oven to prepare a positive electrode active material of lithium composite metal oxide doped with Y, Zr, and Al.

EXAMPLE 1-6

Preparation of Positive Electrode Active Material

After zirconia nanopowder ($D_{50}$=50 nm) was added in a concentration of 2,000 ppm and $Al_2O_3$ nanopowder ($D_{50}$=50 nm) was added in a concentration of 2,000 ppm to a $Ni_{0.83}Co_{0.11}Mn_{0.06}(OH)_2$ precursor ($D_{50}$=15 μm, average plate thickness of plate-shaped primary particles=95 nm), mixing was performed by applying an acoustic energy of 60 g for 2 minutes using an acoustic mixer (LabRAM II).

After LiOH was added to the mixed precursor in a molar ratio of 1.03 and mixing was performed by applying an acoustic energy of 80 g for 2 minutes using an acoustic mixer (LabRAM II), a heat treatment was performed at 780° C. in an oxygen atmosphere. After the product after the heat treatment was dispersed in deionized water, it was washed at 400 rpm for 5 minutes by using a mechanical stirrer, was filtered for 3 minutes, and was then dried at 130° C. for 12 hours or more in a vacuum oven to prepare a positive electrode active material.

EXPERIMENTAL EXAMPLE 5

After 5 g of each of the positive electrode active materials prepared in Example 1-5 and Example 1-6 was added to 100 ml of deionized water and stirred for 5 minutes, the resulting solution was filtered, an amount of HCl consumed by a change in pH was measured by adding 0.1 M HCl using a pH titrator until the pH reached 4, and unreacted LiOH and $Li_2CO_3$ were calculated according to the following Equations 1 and 2 using an amount of the HCl added at the endpoint of titration (EP, FP). The results thereof are presented in Table 3 below.

$$LiOH(wt\ \%)=100\times[(2\times EP-FP)\times0.1\times0.001\times23.94]/5 \quad [Equation\ 1]$$

$$Li_2CO_3(wt\ \%)=100\times[(FP-EP)\times0.1\times0.001\times73.89]/5 \quad [Equation\ 2]$$

In Formulae 1 and 2, EP denotes an evaluation point and FP denotes a fixed point.

TABLE 3

|  | $Li_2CO_3$ (wt %) | LiOH (wt %) | Excess Li (wt %) | Initial pH |
|---|---|---|---|---|
| Example 1-5 | 0.1077 | 0.1452 | 0.2529 | 11.0023 |
| Example 1-6 | 0.1915 | 0.2106 | 0.4021 | 11.6629 |

From the experimental results, the positive electrode active material of Example 1-5 using the acoustic mixer during the washing process exhibited more reduced pH values and amounts of the impurities than Example 1-6.

Figure 13:
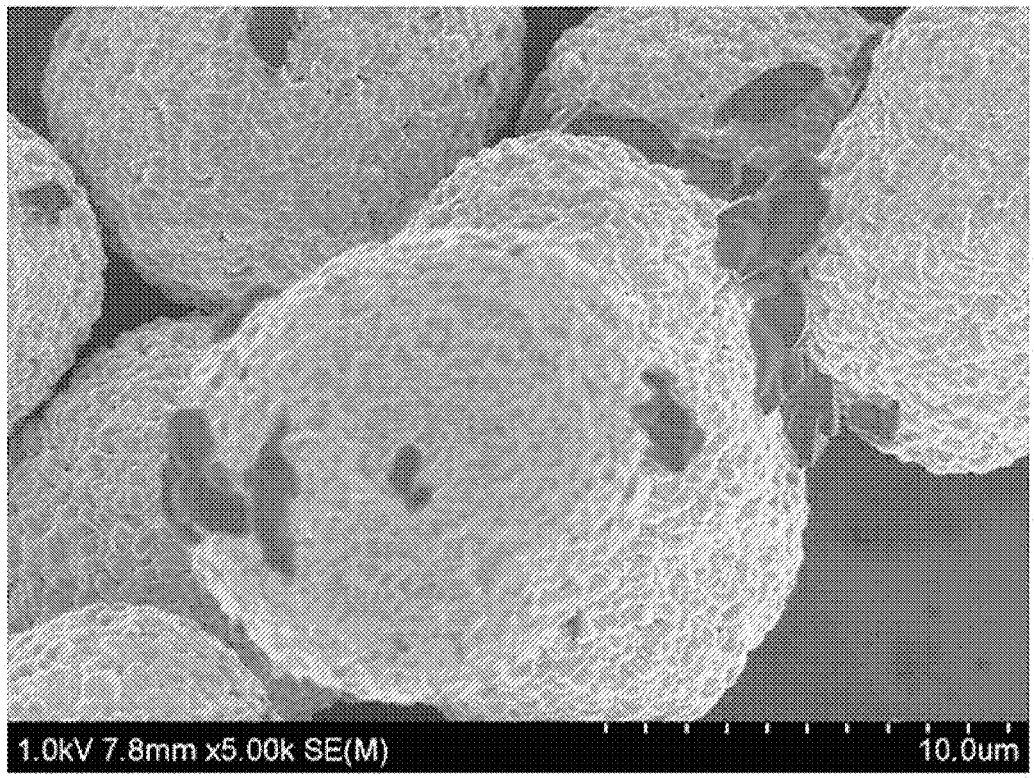
FIG. 13 is an SEM image of a surface of a positive electrode active material prepared in Example 1-6.

Also, the surface of the positive electrode active material prepared in Example 1-6 was observed with an SEM, and the results thereof are presented in FIG. 13.

From the observation results, in the positive electrode active material of Example 1-6 which was prepared and washed by a conventional method, Li residues were observed between particles.

EXAMPLE 1-7

Preparation of Positive Electrode Active Material

A positive electrode active material of lithium composite metal oxide doped with Al was prepared in the same manner as in Example 1-5 except that $Al_2O_3$ was used instead of YSZ.

EXAMPLE 1-8

Preparation of Positive Electrode Active Material

A positive electrode active material of lithium composite metal oxide doped with ceramic elements (Sc and Zr) derived from a raw material including a SSZ doping element was prepared in the same manner as in Example 1-5 except that SSZ was used instead of YSZ.

EXAMPLE 2-1

Preparation of Lithium Secondary Battery

A positive electrode slurry was prepared by adding 94 wt % of the positive electrode active material prepared in Example 1-1, 3 wt % of carbon black as a conductive agent, and 3 wt % of polyvinylidene fluoride (PVdF) as a binder to N-methyl-2-pyrrolidone (NMP) as a solvent. An about 20 μm thick aluminum (Al) thin film, as a positive electrode collector, was coated with the positive electrode slurry and dried, and the coated Al thin film was then roll-pressed to prepare a positive electrode.

A negative electrode slurry was prepared by mixing 96.3 wt % of graphite powder as a negative electrode active material, 1.0 wt % of super-p as a conductive agent, and 1.5 wt % of styrene-butadiene rubber (SBR) and 1.2 wt % of carboxymethyl cellulose (CMC) as a binder, and adding the mixture to NMP as a solvent. An about 10 μm thick copper (Cu) thin film, as a negative electrode collector, was coated with the negative electrode slurry and dried, and the coated Cu thin film was then roll-pressed to prepare a negative electrode.

A 1 M $LiPF_6$ non-aqueous electrolyte solution was prepared by adding $LiPF_6$ to a non-aqueous electrolyte solvent that was prepared by mixing ethylene carbonate and diethyl carbonate, as an electrolyte, at a volume ratio of 30:70.

A cell was prepared by disposing a porous polyethylene separator between the positive electrode and negative electrode prepared as above and injecting the lithium salt-containing electrolyte solution.

EXAMPLES 2-2 TO 2-8

Preparation of Lithium Secondary Batteries

Lithium secondary batteries were prepared in the same manner as in Example 2-1 except that each of the positive electrode active materials prepared in Examples 1-2 to 1-8 was used.

From the above-described experimental results, since the positive electrode active material doped with the metallic element for forming the raw material including a doping element by using acoustic resonance according to the present invention had more improved structural stability, it was confirmed that capacity reduction was minimized when used in the battery, and, as a result, better cycle characteristics were obtained.

The invention claimed is:

1. A method of preparing a positive electrode active material for a secondary battery, the method comprising:
   mixing a metal precursor for a positive electrode active material and a raw material including a doping element using acoustic resonance to prepare a precursor doped with the doping element; and
   mixing the doped precursor with a lithium raw material and performing a heat treatment,
   wherein an average particle diameter ratio of the metal precursor for a positive electrode active material to the raw material including a doping element is in a range of 5:1 to 2,000:1.

2. The method of claim 1, wherein the doping element comprises at least one element selected from the group consisting of yttrium (Y), zirconium (Zr), lanthanum (La), strontium (Sr), gallium (Ga), magnesium (Mg), scandium (Sc), gadolinium (Gd), samarium (Sm), calcium (Ca), cerium (Ce), iron (Fe), aluminum (Al), titanium (Ti), tantalum (Ta), niobium (Nb), tungsten (W), molybdenum (Mo), and chromium (Cr).

3. The method of claim 1, wherein the raw material including a doping element comprises one selected from the group consisting of an oxide, a hydroxide, and an oxyhydroxide which include the doping element, or a mixture of two or more thereof.

4. The method of claim 1, wherein the raw material including a doping element comprises one selected from the group consisting of yttria-stabilized zirconia, gadolinia-doped ceria, lanthanum strontium gallate magnesite, lanthanum strontium manganite, calcia-stabilized zirconia, scandia-stabilized zirconia, Ni-yttria stabilized zirconia cermet, and $Al_2O_3$, or a mixture of two or more thereof.

5. The method of claim 1, wherein an average particle diameter ($D_{50}$) of the raw material including a doping element is in a range of 4 nm to 5 μm.

6. The method of claim 1, wherein the raw material including a doping element is used in an amount of 500 ppm to 10,000 ppm based on a total amount of the metal precursor for a positive electrode active material and the raw material including a doping element.

7. The method of claim 1, wherein the metal precursor for a positive electrode active material comprises one selected from the group consisting of an oxide, a hydroxide, and an oxyhydroxide which include a metal for a positive electrode active material, or a mixture of two or more thereof,
wherein the metal for a positive electrode active material comprises at least one metallic element selected from the group consisting of nickel, cobalt, manganese, and aluminum.

8. The method of claim 1, wherein an average particle diameter ($D_{50}$) of the metal precursor for a positive electrode active material is in a range of 10 μm to 20 μm.

9. The method of claim 1, wherein the acoustic resonance is performed by applying an acoustic energy of 50 g to 90 g.

10. The method of claim 1, wherein the metal precursor for a positive electrode active material is a secondary particle in which plate-shaped primary particles are agglomerated, and the primary particles have an average plate thickness of 150 nm or less,
wherein the acoustic resonance is performed by applying an acoustic energy of 50 g to 90 g for 1 minute to 4 minutes.

11. The method of claim 1, wherein the metal precursor for a positive electrode active material is a secondary particle in which plate-shaped primary particles are agglomerated, and the primary particles have an average plate thickness of greater than 150 nm,
wherein the acoustic resonance is performed by applying an acoustic energy of 60 g to 90 g for 2 minutes to 5 minutes.

12. The method of claim 1, wherein the acoustic resonance is performed by using an acoustic mixer.

13. The method of claim 1, wherein the mixing of the doped precursor with the lithium raw material is performed by acoustic resonance.

14. The method of claim 1, wherein the heat treatment is performed in a temperature range of 700° C. to 950° C.

15. The method of claim 1, further comprising a washing process of a product obtained after the heat treatment,
wherein the washing process is performed using acoustic resonance.

16. The method of claim 1, further comprising a surface treatment process of a product obtained after the heat treatment,
wherein the surface treatment process is performed by mixing the product obtained after the heat treatment with a surface treatment agent using acoustic resonance and performing a heat treatment.

* * * * *